Jan. 31, 1956   P. R. CARLTON   2,733,094
PORTABLE FOOD-VENDING CRIBS
Filed Aug. 4, 1951
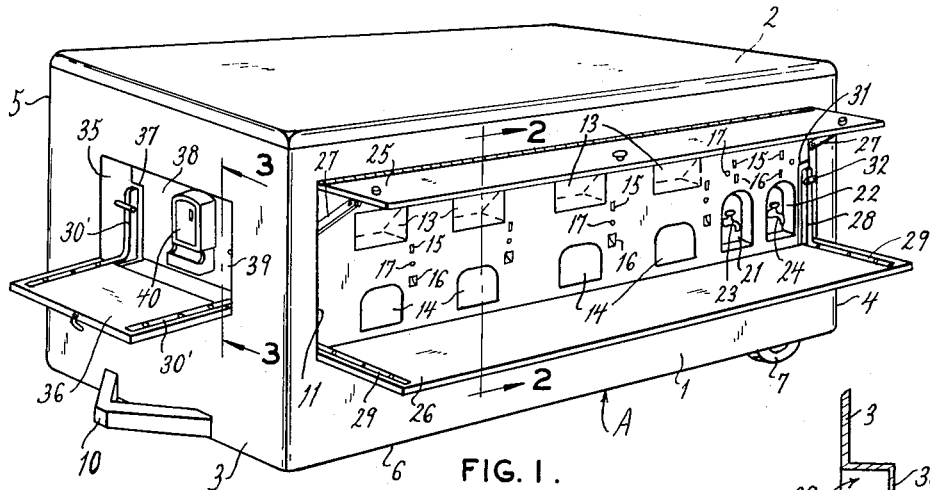
FIG. 1.
FIG. 3.
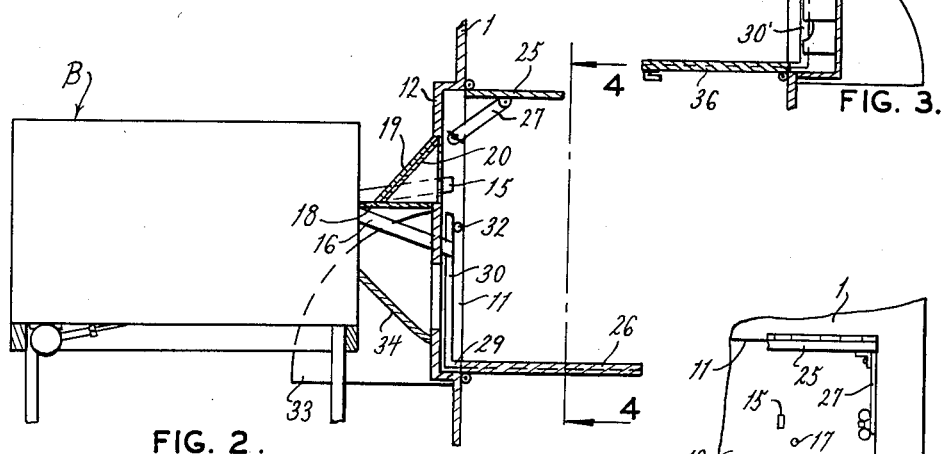
FIG. 2.
FIG. 4.
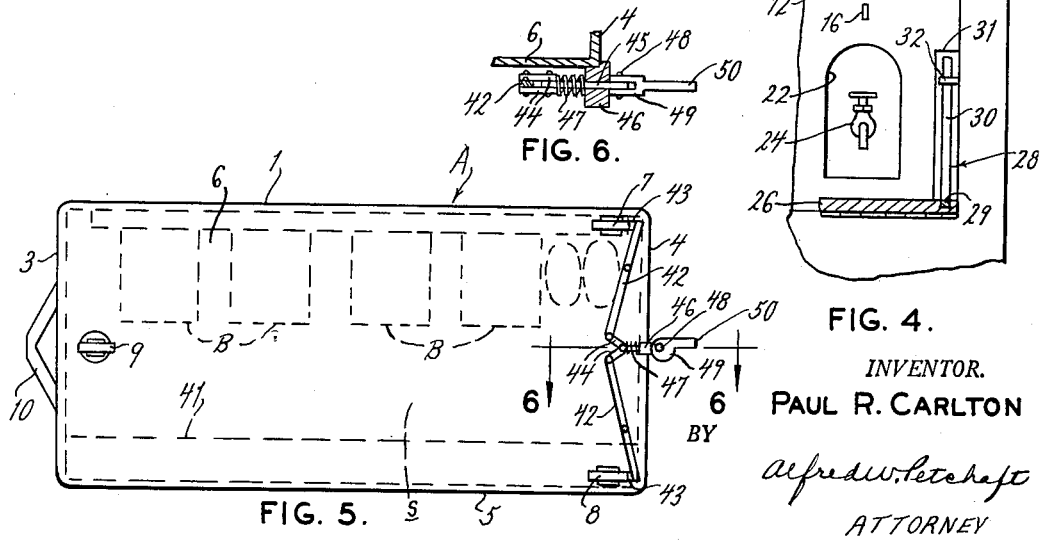
FIG. 6.
FIG. 5.
INVENTOR.
PAUL R. CARLTON
BY
Alfred W. Petchaft
ATTORNEY United States Patent Office 2,733,094
Patented Jan. 31, 1956

2,733,094
PORTABLE FOOD-VENDING CRIBS

Paul R. Carlton, Rock Island, Ill.

Application August 4, 1951, Serial No. 240,403

3 Claims. (Cl. 296—22)

This invention relates in general to certain new and useful improvements in portable food vending cribs.

At the present time workmen in various industrial plants are required to carry lunch in the old-fashioned lunch box or purchase box lunches from itinerant venders and lunch wagons which draw up to the plant location during the noon hour. These expedients are, of course, not particularly satisfactory because the workman does not thereby have an opportunity to eat a hot lunch although hot lunches are considered to be extremely desirable in order to maintain the workman's efficiency, particularly in cold weather. The lunch box and the box lunch purchased from the lunch wagon or vender are, furthermore, somewhat unsanitary and, in addition to this, plant managers usually try to stagger lunch hours so that the plant may not have its operations completely interrupted at any one particular time during the day. The only practical solution for employee food supply in large plants has been the so-called company restaurant or cafeteria.

Many large plants maintain cafeterias or restaurants which are usually subsidized by the company and have a central dining room and kitchen. The difficulty in such facilities lies in the fact that company-operated lunchrooms are limited in facilities so that at the noon hour a great deal of crowding, delay, and congestion result. Furthermore, industrial plants are not usually staffed with people who are skilled in the maintenance and operation of restaurants so the company owned and operated lunchrooms are not profitable either to the company or to the workmen who are required to eat in such a place. The company owned and operated lunchroom, furthermore, is so expensive to install and operate that it is not within the financial reach of small or middle-sized industrial plants employing limited numbers of working men.

It is, therefore, one of the primary objects of the present invention to provide a portable food vending crib which is entirely self-contained and yet is highly mobile so that it can be moved from place to place wherever convenience or need may require.

It is another object of the present invention to provide a portable food vending crib which is capable of being completely sanitized and moved into the plant area in close proximity to the department or work area being served with food so that the workmen may quickly purchase automatically vended hot food with a minimum of delay and inconvenience.

It is another object of the present invention to provide a portable food vending crib which is largely automatic and can be operated with a minimum number of employees so that needless expense will be avoided.

It is an additional object of the present invention to provide a portable food vending crib which can be removed from the plant area after the lunch hour so that it may be transported to a central kitchen or servicing plant in which it can be completely sanitized and restocked for further use.

It is, furthermore, an object of the present invention to provide a portable food vending crib which can be moved around an industrial plant from department to department to serve the convenience of the workmen who are given staggered lunch hours.

With the above and other objects in view, my invention resides in the novel features of form, construction, arrangement, and combination of parts presently described and pointed out in the claims.

In the accompanying drawings—

Figure 1 is a perspective view of a portable food vending crib constructed in accordance with and embodying the present invention;

Figures 2 and 3 are fragmentary sectional views taken along lines 2—2 and 3—3, respectively of Figure 1;

Figure 4 is a fragmentary sectional view taken along line 4—4 of Figure 2;

Figure 5 is a bottom or underside plan view of the portable food-vending crib; and Figure 6 is a fragmentary sectional view taken along line 6—6 of Figure 5.

Referring now in more detail and by reference characters to the drawings, which illustrate a preferred embodiment of the present invention, A designates a portable food-vending crib constructed very much in the manner of an automobile trailer comprising a side wall 1, a roof or top wall 2, end walls 3, 4, a rear wall 5, and a floor or bottom wall 6.

Operatively mounted upon the bottom wall 6 adjacent the end wall 4 are two axially aligned wheels or rollers 7, 8, and similarly mounted centrally of the bottom wall and adjacent the upper end wall 3 is a swivelling roller 9. The end wall 3 is, furthermore, provided adjacent its lower extremity, with a forwardly extending V-shaped draw-frame 10 by which the entire crib A can be connected to a suitable vehicle, such as an automobile, truck, or tractor, and be moved from place to place.

The front wall 1 is provided with a long rectangular opening 11 having a rearwardly or inwardly off-set inner or back wall 12, which is provided in its forwardly presented face with a plurality of rectangular windowed compartments 13 and directly below each such compartment is an opening 14 through which a food package may be vended. Adjacent one side of the windowed compartment 13 and opening 14 are a coin depositing slot 15, a coin return slot 16, and a coin reject button 17, the latter all being conventional mechanism usually associated with coin vending machines. The windowed compartment 13 is interiorly provided with a flat floor 18 and an oblique back wall 19 preferably disposed at an angle of approximately 45° to the bottom wall 18 and provided on its forwardly presented face with a glass mirror or similar light reflective surface 20 so that the particular item of food which is to be dispensed from that particular bank of dispensing equipment can be attractively displayed in the compartment 13 and will be readily visible from both the front and top as the purchaser stands approximately in front of it. At one end the wall 12 is provided with a pair of elongated recesses 21, 22, each having a coin deposit slot 15, a coin return slot 16, and a coin reject button 17, directly thereabove. Operatively mounted in the recesses 21, 22, are liquid-dispensing spigots 23, 24, respectively. These spigots can be used for dispensing light coffee and dark coffee or, in the summertime, can be used for dispensing cold orange juice and grape juice or any other type of beverages which may, in that particular season, suit the taste of the customers.

Hingedly mounted across the top and bottom margins of the opening 11 are swingable doors or closure flaps 25, 26. The closure flap 25 swings outwardly as a sort of awning or top cover over the opening and is conventionally propped in outwardly extended or horizontal position by swingable braces 27. The lower closure member 26 swings outwardly into horizontal position having a width substantially greater than the width of the member 25 and co-operating therewith to form a complete closure for the opening 11 when the two are swung, respectively, downwardly and upwardly into closed position. The closure member 26, as has been stated, is relatively wide and is adapted to serve as a slide counter across which the purchasers may slide trays very much in the manner of cafeteria equipment. The closure element 26 is provided at its opposite ends with L-shaped bracket arms 28, the forward legs 29 of which are recessed into the closure element 26 so that the latter will have a smooth uninterrupted slide base when in horizontal position. The brackets 28 each integrally include a relatively wide rigid and strong inner leg member 30 which swings through a suitable vertical opening 31 formed in the wall 12 and is held against a stop pin 32 when the closure element 26 is in horizontal position. The opening 31, in turn, communicates inwardly with an enclosed pocket-like compartment 33, the upper wall of which has the shape of a quarter circle, thereby protecting the interior of the crib A from undue access of dust, dirt, and flying materials which are ordinarily in the atmosphere of industrial plants. When the closure element 26 is swung upwardly into closure-forming position the legs 32 swing inwardly and downwardly within the compartment 33 and are thus enclosed therein when in inoperative position.

Operatively mounted within the interior of the crib upon and adjacent to the inwardly presented face or back face of the wall 12 are food package-dispensing uints B which are coin-actuated and automatically discharged food packages forwardly and downwardly along the inclined chute 34 so as to be accessible for manual removal through the opening 14. It will be noted in this connection that the chute 34 terminates slightly below the upwardly presented lower margin of the opening 14, so that such lower margin will form a stop lip and prevent the food package from hurtling forwardly across the top face of the flap or counter-forming member 26.

The food-dispensing unit B, which is preferably used in connection with the present invention, is more fully described in a copending patent application filed contemporaneously herewith under Serial No. 240,404, filed August 4, 1951.

The end wall 3 is also provided with a rectangular opening 35 having a downwardly swinging door or closure element 36 supported by two L-shaped brackets 30' substantially identical with the previously described bracket 30 and similarly co-operating with slots or apertures 37 formed in the back wall 38 of a shallow compartment 39 located behind the opening 35. Mounted upon the back wall 38 is a conventional napkin dispenser 40. It should be noted in this connection that the compartment 38 is sufficiently deep to completely house the napkin dispenser 40 so that the latter will be fully enclosed and concealed therein when the door 36 is swung up into closure-forming opsition. The door 36 when swung downwardly into horizontal position makes a convenient shelf upon which a stack of trays may be placed for use by the successive customers who come up to the crib A to purchase food. It will be obvious, by reference to Figure 1, that the crib A can be very quickly set up at any location in or adjacent to an industrial plant and thereupon function as an automatic mobile cafeteria, and it will also be understood that the size and number of food-dispensing openings can be varied to suit the requirements and needs of the particular unit or group of working men being served. In some plants, only a few different types of food are commonly purchased by workmen at lunch time, in which case a shorter crib with a small number of vending units may be employed. In other cases, the workmen may have a more varied taste in foods and it will, therefore, be necessary to provide a somewhat longer crib having a larger number of food-vending units. The same observations are, of course, applicable to the liquid-dispensing units. Some plants may require a larger number of different choices of liquids, in which case a correspondingly greater number of liquid beverage-dispensing spigots may be supplied.

As will be noted by reference to Figure 5, the food-vending units B do not extend through the entire interior area of the crib B, but allow a substantial walking or servicing area s and the interior of the back wall 5 may be provided with a long counter or series of superposed spaced parallel shelves 41 which may be used by the service girl who works in the space s. It will be obvious in this connection that the various food-vending units B may need to be restocked with food packages if there is a heavy volume of business in that particular article of food. In the restaurant business, it is well known that certain types of food are particularly salable at certain times of the year or on certain days of the week. For instance, one might expect a fish sandwich to sell in rather large volume on Friday. Such problems necessitate the employment of at least one employee within the crib to keep all of the units in service during the lunch hour or other rush periods. It has been found in connection with the present invention, however, that a food vending crib A of the type herein contemplated can be efficiently served by one or, at the most, two employees and under such conditions will serve several hundred employees during a relatively short luncheon period, as compared with conventional types of food service operations necessitating six or more employees.

In fact, one of the most costly factors of industrial plants' luncheon service lies in the present requirements for large numbers of employees which are required to keep the customers moving at a fairly efficient rate. This large number of employees, of course, materially raises the per capita cost of such food service and, in many cases, makes such an operation prohibitive for small industrial plants which cannot absorb this type of overhead cost. The present invention, however, being largely automatic, makes possible hot food service in almost any type of industrial plant. It has the further advantage in that the food service unit is entirely self-contained and is effectively sealed against the ingress of dust, flying debris, and other materials which normally render food service operations highly unsanitary. In addition, it is possible to remove the food-vending crib B at the conclusion of the lunch hour and return to a central kitchen or servicing plant in which the crib B can be completely cleansed and restocked for the next food-vending period. This is particularly important to the operators of catering services where it is necessary to serve various different plants within an industrial locality at staggered luncheon periods. The present type of food-vending crib can be brought back to the main or central kitchen, cleaned, restocked, and sent out again to some different plant within a very short period of time so that a number of luncheon periods can be serviced with a single piece of equipment, resulting in the attendant economies of operations.

In order that the food vending crib A may be quickly stabilized against accidental movement when it is set up at a given plant location for food-vending operations, the underside of the bottom wall 6 is provided with a pair of pivoted brace rods 42 extending outwardly and having wheel engaging pads 43. The inner ends of the rods 42 are connected by short angularly forward pivoted links 44 to a centrally located pull rod 45 which is slidably mounted in a suitable sleeve 46 and biased rearwardly by a compressure spring 47. At its outer end the rod 45 is provided with a vertical pin 48 to which is rotatably mounted a toggle-cam 49 integrally formed with a tangentially projecting handle 50. The toggle-cam 49 bears against the outwardly presented face of the end wall 2 and is normally held either in the position shown in Figure 5 or in a position approximately 100° from such position, in which latter position the rod 45 is pulled backwardly, forcing the pads 43 tightly up against the wheels 7, 8, and thereby locking the crib A against accidental movement. Since the wheels 7, 8, are relatively large and the crib A is substantially heavy, this breaking action against the wheels 7, 8, will be sufficient to hold the crib in relatively stationary position during food-vending operations. When it is desired to render the crib A mobile again the handle 50 is swung into outwardly extended position and the wheels 7, 8, are free for rolling movement.

It should be understood that changes and modifications in the form, construction, arrangement, and combination of the several parts of the portable food-vending crib may be made and substituted for those herein shown and described without departing from the nature and principle of my invention.

Having thus described my invention, what I claim and desire to secure by Letters Patent is:

1. A mobile automatic food-vending self-service cafeteria comprising a completely enclosed trailer-like vehicle having a side wall provided with an elongated recess having a door-like closure adapted to fold down into a horizontal counter along which customers may slide their trays, an inwardly offset back wall extending closurewise across the recess, and a plurality of heat-insulated food-vending machines operatively mounted in said back wall and arranged in successive order lengthwise along the counter, said food vending machines being substantially concealed by the back wall and having openings through which food can be discharged to the customer.

2. A mobile automatic food-vending self-service cafeteria comprising a trailer-like wheeled vehicle having a side wall provided with a rectangular opening therein, a closure-forming element swingably mounted along the lower horizontal margin of such opening and being adapted to swing outwardly into horizontal shelf-forming position in front of said opening, means associated with the closure-forming element for securely holding said element in shelf-forming horizontal position, said opening being provided with an inwardly off-set back wall forming an interior closure for the opening, and a plurality of automatic coin-operated food-vending units operatively mounted in said back wall and having delivery chutes discharging approximately at shelf-height.

3. For use with a mobile self-service food-vending unit including a side wall provided with an elongated rectangular opening having a horizontal lower margin; a rectangular door having inner and outer faces and being hingedly connected to the side wall along the lower margin of the opening therein so as to swing from a vertical position closurewise across said opening with its inner face presented inwardly to the opening, to a horizontal position with its inner face presented upwardly to form a slide-shelf along which a customer may slide a tray, a pair of L-shaped brackets, one leg of each bracket being fastened to the inner face of the door adjacent to a lateral margin thereof, said leg being flush on its external face with the inner face of the door and extending inwardly beyond the hinged margin of the door when the latter is in horizontal position, the other leg of each bracket extending upwardly and interiorly along the adjacent vertical margin of said opening when the door is in horizontal position and being adapted to swing inwardly and downwardly into the interior of the unit as the door is swung upwardly into vertical position, and stop means mounted in the proximity of the opening for engaging said last mentioned leg when the latter is swung upwardly, whereby to hold such leg in substantiallly upwardly-swung position and the door in horizontal position so that the inner face of the door will be substantially unobstructed from end to end when in slide-shelf forming position.

References Cited in the file of this patent

UNITED STATES PATENTS

| | | |
|---|---|---|
| 215,165 | Romine | May 6, 1879 |
| 545,813 | Pooley et al. | Sept. 3, 1895 |
| 564,562 | Holman | July 21, 1896 |
| 674,318 | Rey | May 14, 1901 |
| 1,085,573 | Adams | Jan. 27, 1914 |
| 1,150,674 | Grunewald | Aug. 17, 1915 |
| 1,371,234 | Fruitticher | Mar. 15, 1921 |
| 2,299,583 | Loewy et al. | Oct. 20, 1942 |

FOREIGN PATENTS

| | | |
|---|---|---|
| 732,688 | France | June 20, 1932 |
| 555,026 | Great Britain | July 29, 1943 |
| 286,738 | Italy | June 20, 1931 |